(12) United States Patent
Luo et al.

(10) Patent No.: US 11,743,489 B2
(45) Date of Patent: Aug. 29, 2023

(54) MOTION COMPENSATION METHODS FOR VIDEO CODING

(71) Applicant: ALIBABA GROUP HOLDING LIMITED, Grand Cayman (KY)

(72) Inventors: Jiancong Luo, San Mateo, CA (US); Zhao Wang, Beijing (CN); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/556,231

(22) Filed: Dec. 20, 2021

(65) Prior Publication Data

US 2022/0116653 A1 Apr. 14, 2022

Related U.S. Application Data

(63) Continuation of application No. 17/002,190, filed on Aug. 25, 2020, now Pat. No. 11,218,724.
(Continued)

(51) Int. Cl.
*H04N 7/12* (2006.01)
*H04N 19/513* (2014.01)
(Continued)

(52) U.S. Cl.
CPC ......... *H04N 19/521* (2014.11); *H04N 19/117* (2014.11); *H04N 19/132* (2014.11); *H04N 19/172* (2014.11)

(58) Field of Classification Search
CPC .. H04N 19/521; H04N 19/117; H04N 19/132; H04N 19/172; H04N 19/136; H04N 19/176; H04N 19/523
(Continued)

(56) References Cited

U.S. PATENT DOCUMENTS 9,460,488 B2 * 10/2016 Jeon ...................... H04N 19/82
2004/0062307 A1    4/2004 Hallapuro
(Continued)

FOREIGN PATENT DOCUMENTS

WO    WO 2021/061322 A1    4/2021

OTHER PUBLICATIONS

"Requirements for a Future Video Coding Standard v5," International Organisation for Standardisation, Torino, IT, 14 pages (2017).
(Continued)

*Primary Examiner* — Gims S Philippe
(74) *Attorney, Agent, or Firm* — Finnegan, Henderson, Farabow, Garrett & Dunner, LLP

(57) ABSTRACT

The present disclosure provides methods and systems for motion compensation. The method can include: determining a plurality of intermediate interpolation coefficients of an interpolation filter, the determining of the plurality of intermediate interpolation coefficients being: based on positions of a plurality of integer samples respectively, and based on fractional reference positions of a plurality of fractional samples respectively; determining a plurality of integer interpolation coefficients of the interpolation filter by rounding the plurality of intermediate interpolation coefficients to a plurality of integers respectively; and applying the plurality of integer interpolation coefficients on a picture to perform motion compensation prediction.

20 Claims, 22 Drawing Sheets

Related U.S. Application Data

(60) Provisional application No. 62/904,718, filed on Sep. 24, 2019.

(51) Int. Cl.
*H04N 19/172* (2014.01)
*H04N 19/132* (2014.01)
*H04N 19/117* (2014.01)

(58) Field of Classification Search
USPC .................................................. 375/240.12
See application file for complete search history.

(56) References Cited

U.S. PATENT DOCUMENTS

| | | | |
|---|---|---|---|
| 2005/0149593 A1 | 7/2005 | Koster | |
| 2007/0290900 A1 | 12/2007 | Wang | |
| 2008/0232452 A1 | 9/2008 | Sullivan | |
| 2009/0062649 A1 | 3/2009 | Li | |
| 2009/0257503 A1 | 10/2009 | Ye et al. | |
| 2010/0002770 A1* | 1/2010 | Motta | H04N 19/19 375/E7.076 |
| 2012/0147963 A1* | 6/2012 | Sato | H04N 19/122 375/E7.125 |
| 2012/0163460 A1 | 6/2012 | Chien | |
| 2012/0229602 A1* | 9/2012 | Chen | H04N 19/597 348/43 |
| 2012/0314771 A1* | 12/2012 | Lim | H04N 19/463 382/233 |
| 2014/0003524 A1 | 1/2014 | Jia | |
| 2015/0172715 A1* | 6/2015 | Shimizu | H04N 19/52 375/240.16 |
| 2016/0156912 A1* | 6/2016 | Alshina | H04N 19/117 375/240.12 |
| 2018/0054622 A1 | 2/2018 | Bossen | |
| 2018/0376166 A1 | 12/2018 | Chuang | |
| 2019/0028736 A1 | 1/2019 | Karczewicz et al. | |
| 2019/0268594 A1* | 8/2019 | Lim | H04N 19/80 |
| 2020/0221122 A1 | 7/2020 | Ye | |

OTHER PUBLICATIONS

Bross et al., "Versatile Video Coding (Draft 5)," JVET-N1001-v8, 14th Meeting: Geneva, CH Mar. 19-27, 2019, 300 pages.

Bross et al., "Versatile Video Coding (Draft 6), "JVET-O2001-vE, 15th Meeting: Gothenburg, SE, Jul. 3-12, 2019, 455 pages.

Chen et al., "Algorithm Description of Joint Exploration Test Model 7 (JEM 7)," JVET-G1001-v1, 7th Meeting: Torino, IT, Jul. 13-21, 2017, 50 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

Li et al., "CE2: Using the shorter-tap filter for 4x4 sized partitions (Test 2.4.6)," JVET-N0196-v1, 14th Meeting: Geneva, CH Mar. 19-27, 2019, 10 pages.

Ugur et al., "Motion Compensated Prediction and Interpolation Filter Design in H. 265/HEVC," IEEE Journal of Selected Topics in Signal Processing, vol. 7, No. 6, Dec. 2013, pp. 946-956.

PCT International Search Report and Written Opinion dated Nov. 20, 2020, issued in corresponding International Application No. PCT/US2020/047766 (7 pgs.).

* cited by examiner

Table 6

| Fractional positions | Interpolation filter coefficients for each reference sample position ||||||||
|---|---|---|---|---|---|---|---|---|
| | p[-3] | p[-2] | p[-1] | p[0] | p[1] | p[2] | p[3] | p[4] |
| 1/4 | -1 | 4 | -10 | 58 | 17 | -5 | 1 | 0 |
| 1/2 | -1 | 4 | -11 | 40 | 40 | -11 | 4 | -1 |
| 3/4 | 0 | 1 | -5 | 17 | 58 | -10 | 4 | -1 |

FIG. 6: Luma interpolation filter in HEVC

Table 7

| Fractional positions | Interpolation filter coefficients for each reference sample position | | | |
|---|---|---|---|---|
| | p[-1] | p[0] | p[1] | p[2] |
| 1/8 | -2 | 58 | 10 | -2 |
| 1/4 | -4 | 54 | 16 | -2 |
| 3/8 | -6 | 46 | 28 | -4 |
| 1/2 | -4 | 36 | 36 | -4 |
| 5/8 | -4 | 28 | 46 | -6 |
| 3/4 | -2 | 16 | 54 | -4 |
| 7/8 | -2 | 10 | 58 | -2 |

FIG. 7: Chroma interpolation filter in HEVC

Table 8

| Fractional positions | Interpolation filter coefficients for each reference sample position ||||||||
|---|---|---|---|---|---|---|---|---|
| | p[-3] | p[-2] | p[-1] | p[0] | p[1] | p[2] | p[3] | p[4] |
| 1/16 | 0 | 1 | -3 | 63 | 4 | -2 | 1 | 0 |
| 1/8 | -1 | 2 | -5 | 62 | 8 | -3 | 1 | 0 |
| 3/16 | -1 | 3 | -8 | 60 | 13 | -4 | 1 | 0 |
| 1/4 | -1 | 4 | -10 | 58 | 17 | -5 | 1 | 0 |
| 5/16 | -1 | 4 | -11 | 52 | 26 | -8 | 3 | -1 |
| 3/8 | -1 | 3 | -9 | 47 | 31 | -10 | 4 | -1 |
| 7/16 | -1 | 4 | -11 | 45 | 34 | -10 | 4 | -1 |
| 1/2 | -1 | 4 | -11 | 40 | 40 | -11 | 4 | -1 |
| 9/16 | -1 | 4 | -10 | 34 | 45 | -11 | 4 | -1 |
| 5/8 | -1 | 4 | -10 | 31 | 47 | -9 | 3 | -1 |
| 11/16 | -1 | 3 | -8 | 26 | 52 | -11 | 4 | -1 |
| 3/4 | 0 | 1 | -5 | 17 | 58 | -10 | 4 | -1 |
| 13/16 | 0 | 1 | -4 | 13 | 60 | -8 | 3 | -1 |
| 7/8 | 0 | 1 | -3 | 8 | 62 | -5 | 2 | -1 |
| 15/16 | 0 | 1 | -2 | 4 | 63 | -3 | 1 | 0 |

FIG. 8: Luma interpolation filter in VVC

Table 9

| Fractional positions | Interpolation filter coefficients for each reference sample position | | | |
|---|---|---|---|---|
| | p[-1] | p[0] | p[1] | p[2] |
| 1/32 | -1 | 63 | 2 | 0 |
| 1/16 | -2 | 62 | 4 | 0 |
| 3/32 | -2 | 60 | 7 | -1 |
| 1/8 | -2 | 58 | 10 | -2 |
| 5/32 | -3 | 57 | 12 | -2 |
| 3/16 | -4 | 56 | 14 | -2 |
| 7/32 | -4 | 55 | 15 | -2 |
| 1/4 | -4 | 54 | 16 | -2 |
| 9/32 | -5 | 53 | 18 | -2 |
| 5/16 | -6 | 52 | 20 | -2 |
| 11/32 | -6 | 49 | 24 | -3 |
| 3/8 | -6 | 46 | 28 | -4 |
| 13/32 | -5 | 44 | 29 | -4 |
| 7/16 | -4 | 42 | 30 | -4 |
| 15/32 | -4 | 39 | 33 | -4 |
| 1/2 | -4 | 36 | 36 | -4 |
| 17/32 | -4 | 33 | 39 | -4 |
| 9/16 | -4 | 30 | 42 | -4 |
| 19/32 | -4 | 29 | 44 | -5 |
| 5/8 | -4 | 28 | 46 | -6 |
| 21/32 | -3 | 24 | 49 | -6 |
| 11/16 | -2 | 20 | 52 | -6 |
| 23/32 | -2 | 18 | 53 | -5 |
| 3/4 | -2 | 16 | 54 | -4 |
| 25/32 | -2 | 15 | 55 | -4 |
| 13/16 | -2 | 14 | 56 | -4 |
| 27/32 | -2 | 12 | 57 | -3 |
| 7/8 | -2 | 10 | 58 | -2 |
| 29/32 | -1 | 7 | 60 | -2 |
| 15/16 | 0 | 4 | 62 | -2 |
| 31/32 | 0 | 2 | 63 | -1 |

FIG. 9: Chroma interpolation filter in VVC

Table 10

| Fractional positions | Interpolation filter coefficients for each reference sample position ||||||||
|---|---|---|---|---|---|---|---|---|
| | p[-3] | p[-2] | p[-1] | p[0] | p[1] | p[2] | p[3] | p[4] |
| 1/16 | 0 | 1 | -3 | 63 | 4 | -2 | 1 | 0 |
| 1/8 | 0 | 1 | -5 | 62 | 8 | -3 | 1 | 0 |
| 3/16 | 0 | 2 | -8 | 60 | 13 | -4 | 1 | 0 |
| 1/4 | 0 | 3 | -10 | 58 | 17 | -5 | 1 | 0 |
| 5/16 | 0 | 3 | -11 | 52 | 26 | -8 | 2 | 0 |
| 3/8 | 0 | 2 | -9 | 47 | 31 | -10 | 3 | 0 |
| 7/16 | 0 | 3 | -11 | 45 | 34 | -10 | 3 | 0 |
| 1/2 | 0 | 3 | -11 | 40 | 40 | -11 | 3 | 0 |
| 9/16 | 0 | 3 | -10 | 34 | 45 | -11 | 3 | 0 |
| 5/8 | 0 | 3 | -10 | 31 | 47 | -9 | 2 | 0 |
| 11/16 | 0 | 2 | -8 | 26 | 52 | -11 | 3 | 0 |
| 3/4 | 0 | 1 | -5 | 17 | 58 | -10 | 3 | 0 |
| 13/16 | 0 | 1 | -4 | 13 | 60 | -8 | 2 | 0 |
| 7/8 | 0 | 1 | -3 | 8 | 62 | -5 | 1 | 0 |
| 15/16 | 0 | 1 | -2 | 4 | 63 | -3 | 1 | 0 |

FIG. 10: Luma interpolation filter for 4x4 motion compensation in VVC

Table 11

| Fractional position $\alpha$ | 1/16 | 1/8 | 3/16 | 1/4 | 5/16 | 3/8 | 7/16 | 1/2 |
|---|---|---|---|---|---|---|---|---|
| smoothing parameter $m$ | 8.0 | 9.5 | 8.3 | 8.2 | 8.0 | 8.2 | 8.2 | 8.2 |

FIG. 11: The values of smoothing parameter

Table 12

| Fractional positions | Interpolation filter coefficients for each reference sample position ||||||||
|---|---|---|---|---|---|---|---|---|
| | p[-3] | p[-2] | p[-1] | p[0] | p[1] | p[2] | p[3] | p[4] |
| 1/16 | 0 | 0.503 | -2.802 | 63.3 | 3.86 | -1.141 | 0.183 | 0 |
| 1/8 | 0 | 1.046 | -5.252 | 61.82 | 8.325 | -2.604 | 0.529 | 0 |
| 3/16 | 0 | 1.292 | -6.935 | 59.52 | 12.94 | -3.727 | 0.659 | 0 |
| 1/4 | 0 | 1.521 | -8.209 | 56.53 | 17.94 | -4.989 | 0.88 | 0 |
| 5/16 | 0 | 1.627 | -8.959 | 52.87 | 23.14 | -6.141 | 1.063 | 0 |
| 3/8 | 0 | 1.739 | -9.387 | 48.71 | 28.52 | -7.328 | 1.324 | 0 |
| 7/16 | 0 | 1.726 | -9.347 | 44.07 | 33.86 | -8.26 | 1.506 | 0 |
| 1/2 | 0 | 1.644 | -8.953 | 39.08 | 39.08 | -8.953 | 1.644 | 0 |
| 9/16 | 0 | 1.506 | -8.26 | 33.86 | 44.07 | -9.347 | 1.726 | 0 |
| 5/8 | 0 | 1.324 | -7.328 | 28.52 | 48.71 | -9.387 | 1.739 | 0 |
| 11/16 | 0 | 1.063 | -6.141 | 23.14 | 52.87 | -8.959 | 1.627 | 0 |
| 3/4 | 0 | 0.88 | -4.989 | 17.94 | 56.53 | -8.209 | 1.521 | 0 |
| 13/16 | 0 | 0.659 | -3.727 | 12.94 | 59.52 | -6.935 | 1.292 | 0 |
| 7/8 | 0 | 0.529 | -2.604 | 8.325 | 61.82 | -5.252 | 1.046 | 0 |
| 15/16 | 0 | 0.183 | -1.141 | 3.86 | 63.3 | -2.802 | 0.503 | 0 |

FIG. 12: Exemplary 6-tap real-number luma interpolation filter

Table 13

| Fractional positions | Interpolation filter coefficients for each reference sample position | | | | | | | |
|---|---|---|---|---|---|---|---|---|
| | p[-3] | p[-2] | p[-1] | p[0] | p[1] | p[2] | p[3] | p[4] |
| 1/16 | 0 | 1 | -3 | 63 | 4 | -1 | 0 | 0 |
| 1/8 | 0 | 1 | -5 | 62 | 8 | -3 | 1 | 0 |
| 3/16 | 0 | 1 | -7 | 60 | 13 | -4 | 1 | 0 |
| 1/4 | 0 | 2 | -9 | 57 | 18 | -5 | 1 | 0 |
| 5/16 | 0 | 2 | -9 | 53 | 24 | -7 | 1 | 0 |
| 3/8 | 0 | 2 | -10 | 49 | 29 | -8 | 2 | 0 |
| 7/16 | 0 | 2 | -10 | 44 | 34 | -9 | 3 | 0 |
| 1/2 | 0 | 2 | -10 | 40 | 40 | -10 | 2 | 0 |
| 9/16 | 0 | 3 | -9 | 34 | 44 | -10 | 2 | 0 |
| 5/8 | 0 | 2 | -8 | 29 | 49 | -10 | 2 | 0 |
| 11/16 | 0 | 1 | -7 | 24 | 53 | -9 | 2 | 0 |
| 3/4 | 0 | 1 | -5 | 18 | 57 | -9 | 2 | 0 |
| 13/16 | 0 | 1 | -4 | 13 | 60 | -7 | 1 | 0 |
| 7/8 | 0 | 1 | -3 | 8 | 62 | -5 | 1 | 0 |
| 15/16 | 0 | 0 | -1 | 4 | 63 | -3 | 1 | 0 |

FIG. 13: Exemplary 6-tap integer-number luma interpolation filter

Table 14

| Fractional positions | Interpolation filter coefficients for each reference sample position ||||||||
|---|---|---|---|---|---|---|---|---|
| | p[-3] | p[-2] | p[-1] | p[0] | p[1] | p[2] | p[3] | p[4] |
| 1/16 | 0 | 1 | -3 | 63 | 4 | -1 | 0 | 0 |
| 1/8 | 0 | 1 | -5 | 62 | 8 | -3 | 1 | 0 |
| 3/16 | 0 | 1 | -7 | 60 | 13 | -4 | 1 | 0 |
| 1/4 | 0 | 1 | -8 | 57 | 18 | -5 | 1 | 0 |
| 5/16 | 0 | 2 | -9 | 53 | 23 | -6 | 1 | 0 |
| 3/8 | 0 | 2 | -9 | 49 | 28 | -7 | 1 | 0 |
| 7/16 | 0 | 2 | -10 | 44 | 34 | -8 | 2 | 0 |
| 1/2 | 0 | 2 | -9 | 39 | 39 | -9 | 2 | 0 |
| 9/16 | 0 | 2 | -8 | 34 | 44 | -10 | 2 | 0 |
| 5/8 | 0 | 1 | -7 | 28 | 49 | -9 | 2 | 0 |
| 11/16 | 0 | 1 | -6 | 23 | 53 | -9 | 2 | 0 |
| 3/4 | 0 | 1 | -5 | 18 | 57 | -8 | 1 | 0 |
| 13/16 | 0 | 1 | -4 | 13 | 60 | -7 | 1 | 0 |
| 7/8 | 0 | 1 | -3 | 8 | 62 | -5 | 1 | 0 |
| 15/16 | 0 | 0 | -1 | 4 | 63 | -3 | 1 | 0 |

FIG. 14: Exemplary 6-tap integer-number luma interpolation filter

Table 15

| Fractional position $\alpha$ | 1/16 | 1/8 | 3/16 | 1/4 | 5/16 | 3/8 | 7/16 | 1/2 |
|---|---|---|---|---|---|---|---|---|
| smoothing parameter $m$ | 8.0 | 9.5 | 8.3 | 8.2 | 8.0 | 8.2 | 8.2 | 8.2 |

FIG. 15: Exemplary values of smoothing parameter

Table 16

| Fractional positions | Interpolation filter coefficients for each reference sample position | | | | | | | |
|---|---|---|---|---|---|---|---|---|
| | p[-3] | p[-2] | p[-1] | p[0] | p[1] | p[2] | p[3] | p[4] |
| 1/16 | 0 | 0.67 | -2.999 | 63.32 | 4.067 | -1.463 | 0.378 | 0 |
| 1/8 | 0 | 1.287 | -5.54 | 61.86 | 8.596 | -3.047 | 0.809 | 0 |
| 3/16 | 0 | 1.749 | -7.506 | 59.64 | 13.41 | -4.536 | 1.171 | 0 |
| 1/4 | 0 | 2.123 | -8.986 | 56.72 | 18.52 | -6.013 | 1.539 | 0 |
| 5/16 | 0 | 2.377 | -9.956 | 53.18 | 23.79 | -7.366 | 1.864 | 0 |
| 3/8 | 0 | 2.544 | -10.48 | 49.09 | 29.15 | -8.587 | 2.167 | 0 |
| 7/16 | 0 | 2.591 | -10.56 | 44.54 | 34.46 | -9.554 | 2.391 | 0 |
| 1/2 | 0 | 2.537 | -10.23 | 39.63 | 39.63 | -10.23 | 2.537 | 0 |
| 9/16 | 0 | 2.391 | -9.554 | 34.46 | 44.54 | -10.56 | 2.591 | 0 |
| 5/8 | 0 | 2.167 | -8.587 | 29.15 | 49.09 | -10.48 | 2.544 | 0 |
| 11/16 | 0 | 1.864 | -7.366 | 23.79 | 53.18 | -9.956 | 2.377 | 0 |
| 3/4 | 0 | 1.539 | -6.013 | 18.52 | 56.72 | -8.986 | 2.123 | 0 |
| 13/16 | 0 | 1.171 | -4.536 | 13.41 | 59.64 | -7.506 | 1.749 | 0 |
| 7/8 | 0 | 0.809 | -3.047 | 8.596 | 61.86 | -5.54 | 1.287 | 0 |
| 15/16 | 0 | 0.378 | -1.463 | 4.067 | 63.32 | -2.999 | 0.67 | 0 |

FIG. 16: Exemplary 6-tap real-number luma interpolation filter

Table 17

| Fractional positions | Interpolation filter coefficients for each reference sample position | | | | | | | |
|---|---|---|---|---|---|---|---|---|
| | p[-3] | p[-2] | p[-1] | p[0] | p[1] | p[2] | p[3] | p[4] |
| 1/16 | 0 | 1 | -3 | 63 | 4 | -1 | 0 | 0 |
| 1/8 | 0 | 1 | -6 | 62 | 9 | -3 | 1 | 0 |
| 3/16 | 0 | 2 | -8 | 60 | 13 | -4 | 1 | 0 |
| 1/4 | 0 | 2 | -9 | 57 | 19 | -6 | 1 | 0 |
| 5/16 | 0 | 2 | -10 | 53 | 24 | -7 | 2 | 0 |
| 3/8 | 0 | 2 | -10 | 49 | 29 | -8 | 2 | 0 |
| 7/16 | 0 | 3 | -11 | 45 | 34 | -9 | 2 | 0 |
| 1/2 | 0 | 2 | -10 | 40 | 40 | -10 | 2 | 0 |
| 9/16 | 0 | 2 | -9 | 34 | 45 | -11 | 3 | 0 |
| 5/8 | 0 | 2 | -8 | 29 | 49 | -10 | 2 | 0 |
| 11/16 | 0 | 2 | -7 | 24 | 53 | -10 | 2 | 0 |
| 3/4 | 0 | 1 | -6 | 19 | 57 | -9 | 2 | 0 |
| 13/16 | 0 | 1 | -4 | 13 | 60 | -8 | 2 | 0 |
| 7/8 | 0 | 1 | -3 | 9 | 62 | -6 | 1 | 0 |
| 15/16 | 0 | 0 | -1 | 4 | 63 | -3 | 1 | 0 |

FIG. 17: Exemplary 6-tap integer-number luma interpolation filter

Table 18

| Fractional positions | Interpolation filter coefficients for each reference sample position ||||||||
|---|---|---|---|---|---|---|---|---|
| | p[-3] | p[-2] | p[-1] | p[0] | p[1] | p[2] | p[3] | p[4] |
| 1/16 | 0 | 0.729 | -3.065 | 63.323 | 4.136 | -1.575 | 0.451 | 0 |
| 1/8 | 0 | 1.370 | -5.637 | 61.869 | 8.686 | -3.199 | 0.909 | 0 |
| 3/16 | 0 | 1.909 | -7.699 | 59.674 | 13.573 | -4.816 | 1.358 | 0 |
| 1/4 | 0 | 2.336 | -9.250 | 56.788 | 18.712 | -6.367 | 1.780 | 0 |
| 5/16 | 0 | 2.644 | -10.296 | 53.275 | 24.007 | -7.789 | 2.157 | 0 |
| 3/8 | 0 | 2.832 | -10.859 | 49.214 | 29.359 | -9.020 | 2.473 | 0 |
| 7/16 | 0 | 2.901 | -10.969 | 44.693 | 34.661 | -9.998 | 2.711 | 0 |
| 1/2 | 0 | 2.858 | -10.666 | 39.808 | 39.808 | -10.666 | 2.858 | 0 |
| 9/16 | 0 | 2.711 | -9.998 | 34.661 | 44.693 | -10.969 | 2.901 | 0 |
| 5/8 | 0 | 2.473 | -9.020 | 29.359 | 49.214 | -10.859 | 2.832 | 0 |
| 11/16 | 0 | 2.157 | -7.789 | 24.007 | 53.275 | -10.296 | 2.644 | 0 |
| 3/4 | 0 | 1.780 | -6.367 | 18.712 | 56.788 | -9.250 | 2.336 | 0 |
| 13/16 | 0 | 1.358 | -4.816 | 13.573 | 59.674 | -7.699 | 1.909 | 0 |
| 7/8 | 0 | 0.909 | -3.199 | 8.686 | 61.869 | -5.637 | 1.370 | 0 |
| 15/16 | 0 | 0.451 | -1.575 | 4.136 | 63.323 | -3.065 | 0.729 | 0 |

FIG. 18: Exemplary 6-tap real-number luma interpolation filter without smoothing window function Table 19

| Fractional positions | Interpolation filter coefficients for each reference sample position | | | | | | | |
|---|---|---|---|---|---|---|---|---|
| | p[-3] | p[-2] | p[-1] | p[0] | p[1] | p[2] | p[3] | p[4] |
| 1/16 | 0 | 1 | -3 | 63 | 4 | -2 | 1 | 0 |
| 1/8 | 0 | 1 | -6 | 62 | 9 | -3 | 1 | 0 |
| 3/16 | 0 | 2 | -8 | 60 | 14 | -5 | 1 | 0 |
| 1/4 | 0 | 2 | -9 | 57 | 18 | -6 | 2 | 0 |
| 5/16 | 0 | 3 | -10 | 53 | 24 | -8 | 2 | 0 |
| 3/8 | 0 | 3 | -11 | 49 | 29 | -9 | 3 | 0 |
| 7/16 | 0 | 3 | -11 | 45 | 34 | -10 | 3 | 0 |
| 1/2 | 0 | 3 | -11 | 40 | 40 | -11 | 3 | 0 |
| 9/16 | 0 | 3 | -10 | 34 | 45 | -11 | 3 | 0 |
| 5/8 | 0 | 3 | -9 | 29 | 49 | -11 | 2 | 0 |
| 11/16 | 0 | 2 | -8 | 24 | 53 | -10 | 2 | 0 |
| 3/4 | 0 | 2 | -6 | 18 | 57 | -9 | 2 | 0 |
| 13/16 | 0 | 1 | -5 | 14 | 60 | -8 | 2 | 0 |
| 7/8 | 0 | 1 | -3 | 9 | 62 | -6 | 1 | 0 |
| 15/16 | 0 | 1 | -2 | 4 | 63 | -3 | 1 | 0 |

FIG. 19: Exemplary 6-tap integer-number luma interpolation filter without smoothing window function

MOTION COMPENSATION METHODS FOR VIDEO CODING

CROSS REFERENCE TO RELATED APPLICATIONS

The disclosure claims the benefits of priority to U.S. application Ser. No. 17/002,190, filed Aug. 25, 2020, which claims the benefits of priority to U.S. Provisional Application No. 62/904,718, filed Sep. 24, 2019, both of which are incorporated herein by reference in its entirety.

TECHNICAL FIELD

The present disclosure generally relates to video processing, and more particularly, to interpolation filters for motion compensation.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the disclosure provide a computer-implemented method for processing video content. The method can include: determining a plurality of intermediate interpolation coefficients of an interpolation filter, the determining of the plurality of intermediate interpolation coefficients being: based on positions of a plurality of integer samples respectively, and based on fractional reference positions of a plurality of fractional samples respectively; determining a plurality of integer interpolation coefficients of the interpolation filter by rounding the plurality of intermediate interpolation coefficients to a plurality of integers respectively; and applying the plurality of integer interpolation coefficients on a picture to perform motion compensation prediction.

Embodiments of the disclosure also provide a system for processing video content. The system can include: a memory for storing a set of instructions; and at least one processor configured to execute the set of instructions to cause the system to perform: determining a plurality of intermediate interpolation coefficients of an interpolation filter, the determining of the plurality of intermediate interpolation coefficients being: based on positions of a plurality of integer samples respectively, and based on fractional reference positions of a plurality of fractional samples respectively; determining a plurality of integer interpolation coefficients of the interpolation filter by rounding the plurality of intermediate interpolation coefficients to a plurality of integers respectively; and applying the plurality of integer interpolation coefficients on a picture to perform motion compensation prediction.

Embodiments of the disclosure further provide a non-transitory computer readable medium storing instructions that are executable by at least one processor of a computer system, wherein the execution of the instructions causes the computer system to perform a method. The method can include: determining a plurality of intermediate interpolation coefficients of an interpolation filter, the determining of the plurality of intermediate interpolation coefficients being: based on positions of a plurality of integer samples respectively, and based on fractional reference positions of a plurality of fractional samples respectively; determining a plurality of integer interpolation coefficients of the interpolation filter by rounding the plurality of intermediate interpolation coefficients to a plurality of integers respectively; and applying the plurality of integer interpolation coefficients on a picture to perform motion compensation prediction.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates an exemplary luma interpolation filter, consistent with embodiments of the disclosure.

FIG. 7 illustrates an exemplary chroma interpolation filter, consistent with embodiments of the disclosure.

FIG. 8 illustrates another exemplary luma interpolation filter, consistent with embodiments of the disclosure.

FIG. 9 illustrates another exemplary chroma interpolation filter, consistent with embodiments of the disclosure.

FIG. 10 illustrates an exemplary luma interpolation filter for 4×4 motion compensation, consistent with embodiments of the disclosure.

FIG. 11 illustrates exemplary smoothing parameters, consistent with embodiments of the disclosure.

FIG. 12 illustrates an exemplary 6-tap real-number luma interpolation filter, consistent with embodiments of the disclosure.

FIG. 13 illustrates an exemplary 6-tap integer-number luma interpolation filter, consistent with embodiments of the disclosure.

FIG. 14 illustrates an exemplary 6-tap integer-number luma interpolation filter, consistent with embodiments of the disclosure.

FIG. 15 illustrates exemplary smoothing parameters, consistent with embodiments of the disclosure.

FIG. 16 illustrates an exemplary 6-tap real-number luma interpolation filter, consistent with embodiments of the disclosure.

FIG. 17 illustrates an exemplary 6-tap integer-number luma interpolation filter, consistent with embodiments of the disclosure.

FIG. 18 illustrates an exemplary 6-tap real-number luma interpolation filter without smoothing window function, consistent with embodiments of the disclosure.

FIG. 19 illustrates an exemplary 6-tap integer-number luma interpolation filter without smoothing window function, consistent with embodiments of the disclosure.

DETAILED DESCRIPTION

Figure 1:
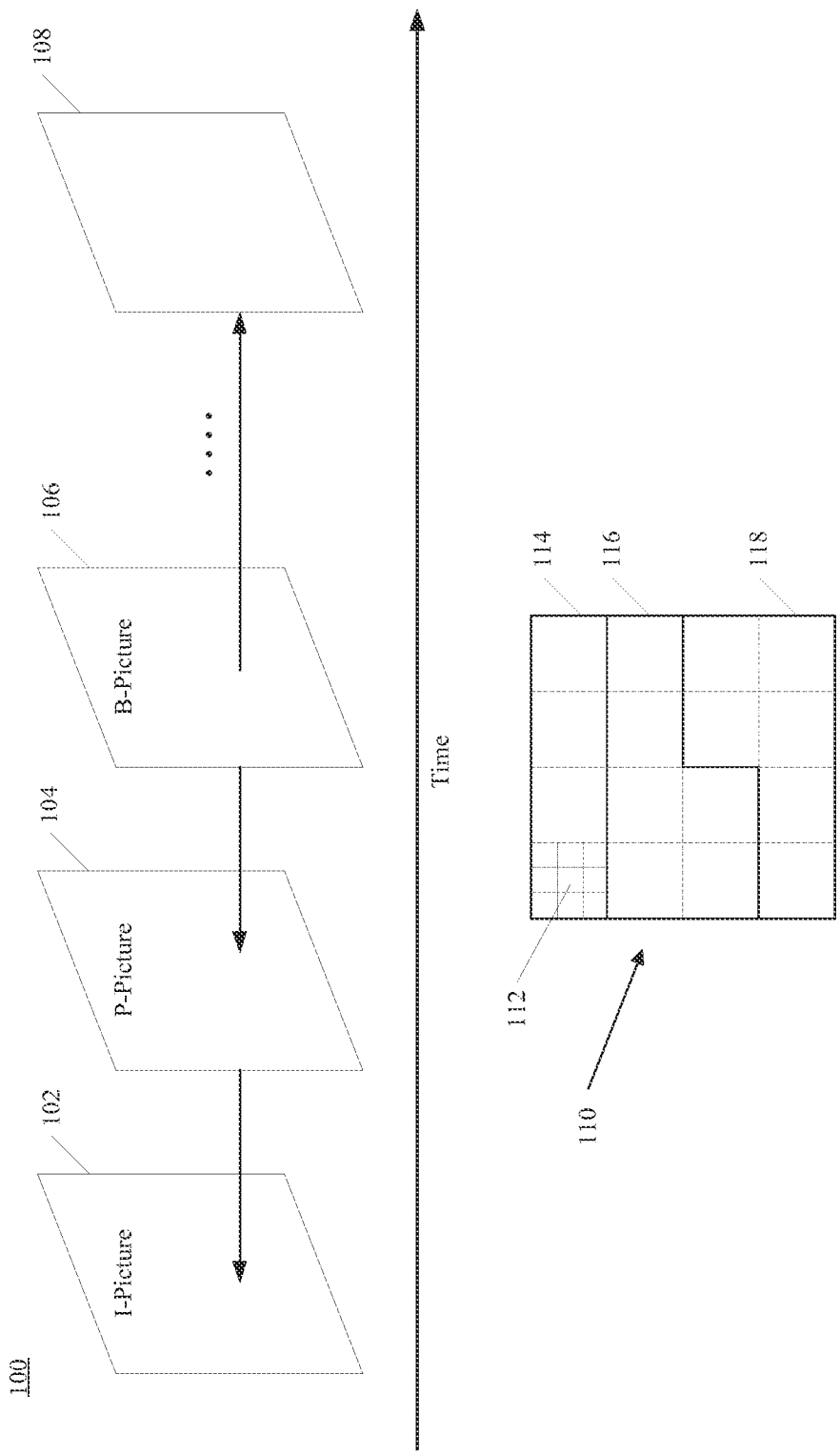
FIG. 1 illustrates structures of an exemplary video sequence, consistent with embodiments of the disclosure, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video monitoring that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most monitoring videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

FIG. 1 illustrates structures of an example video sequence 100, consistent with embodiments of the disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
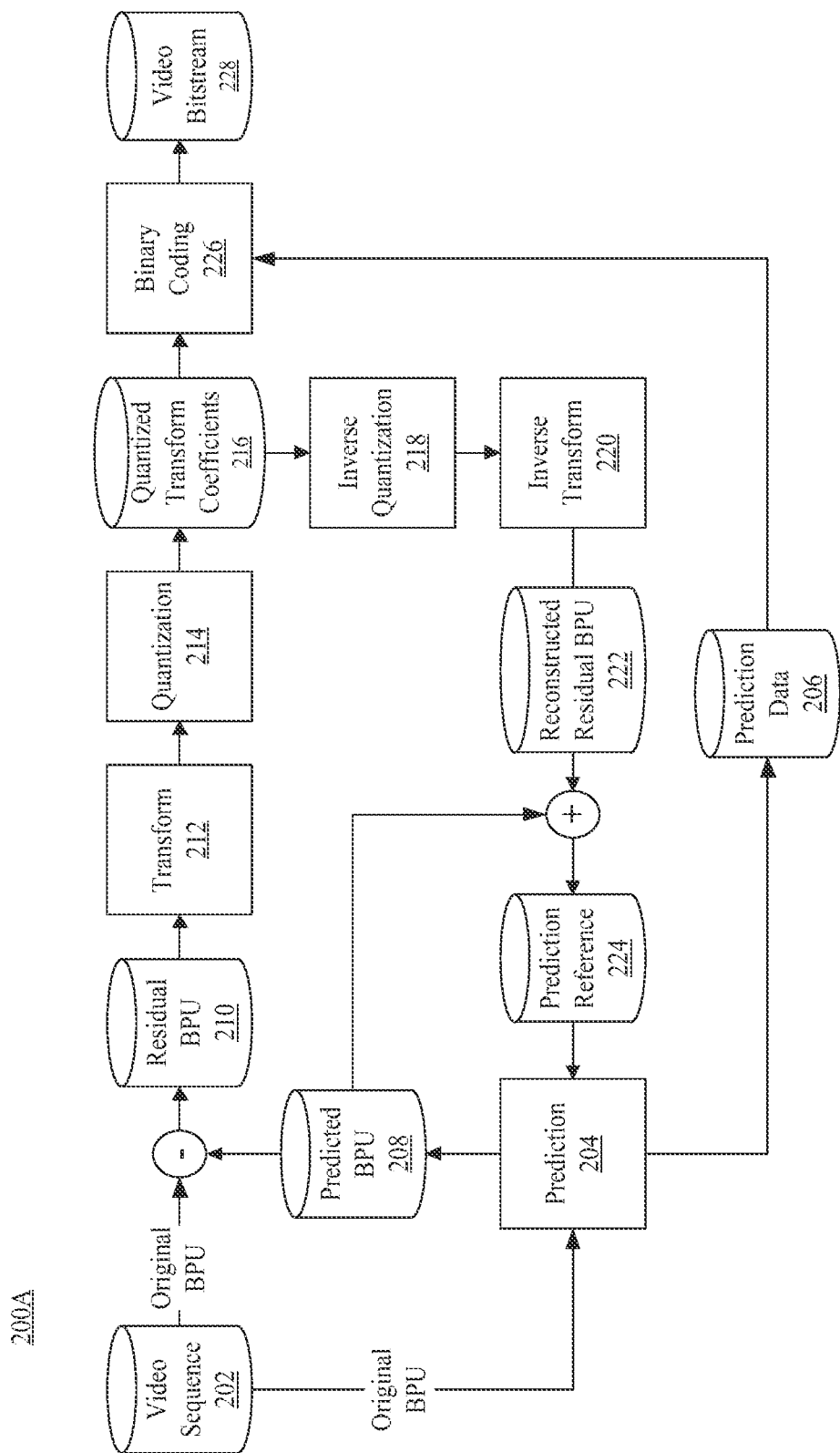
FIG. 2A illustrates a schematic diagram of an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
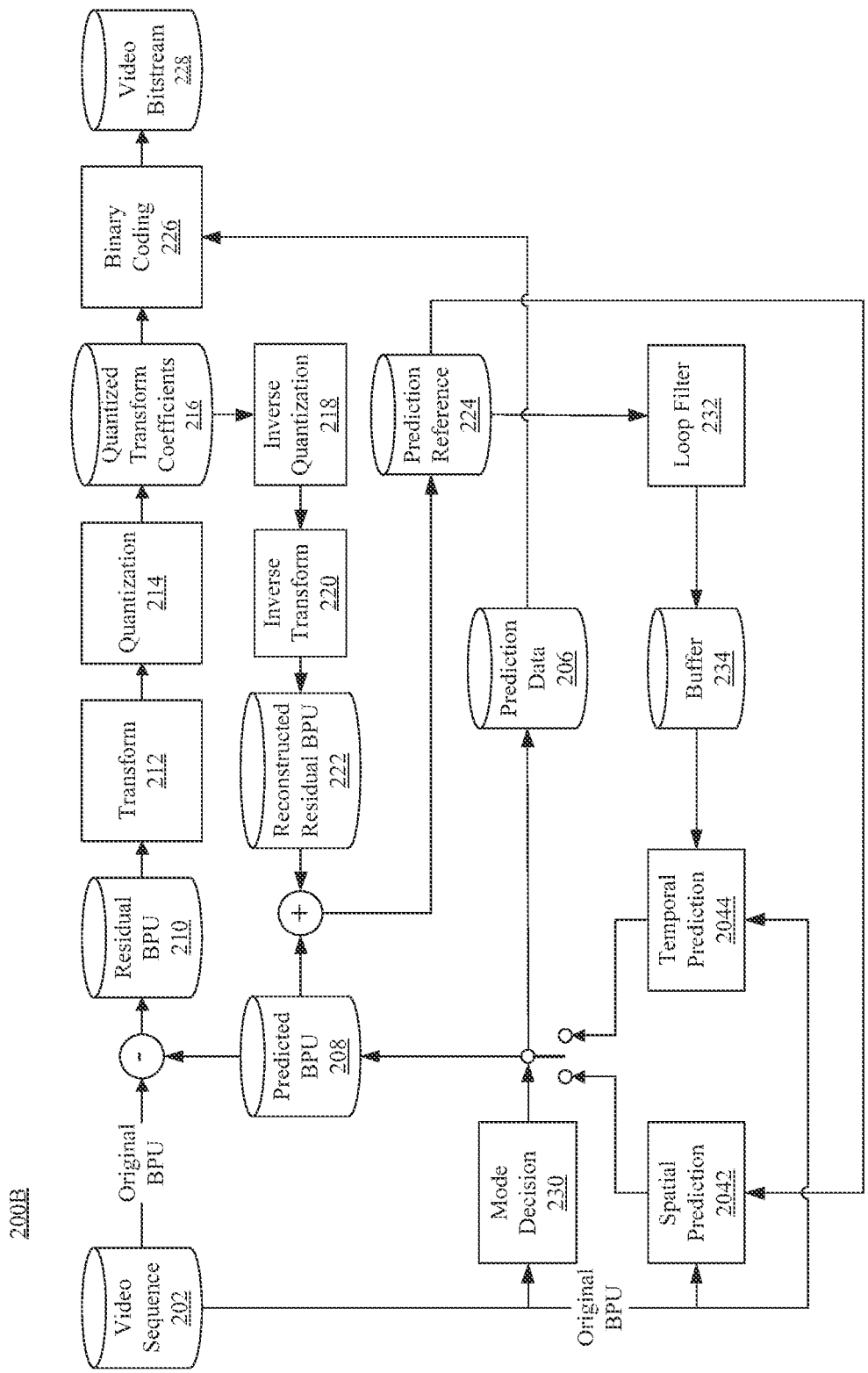
FIG. 2B illustrates a schematic diagram of another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
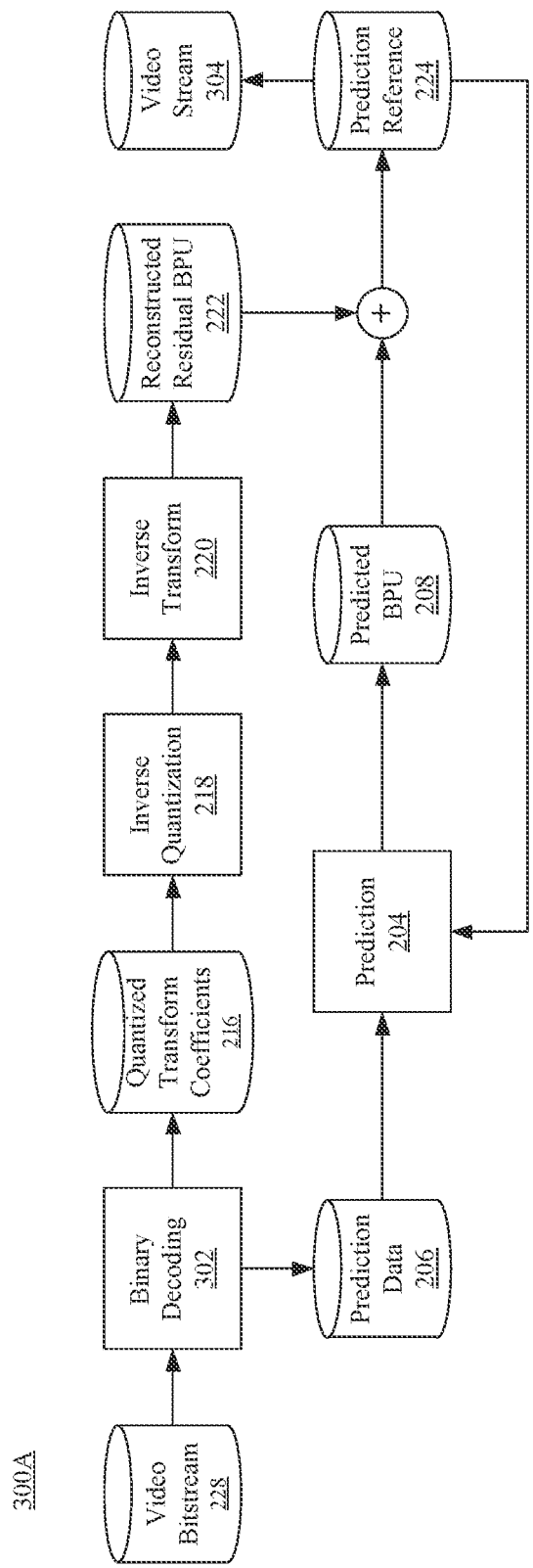
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
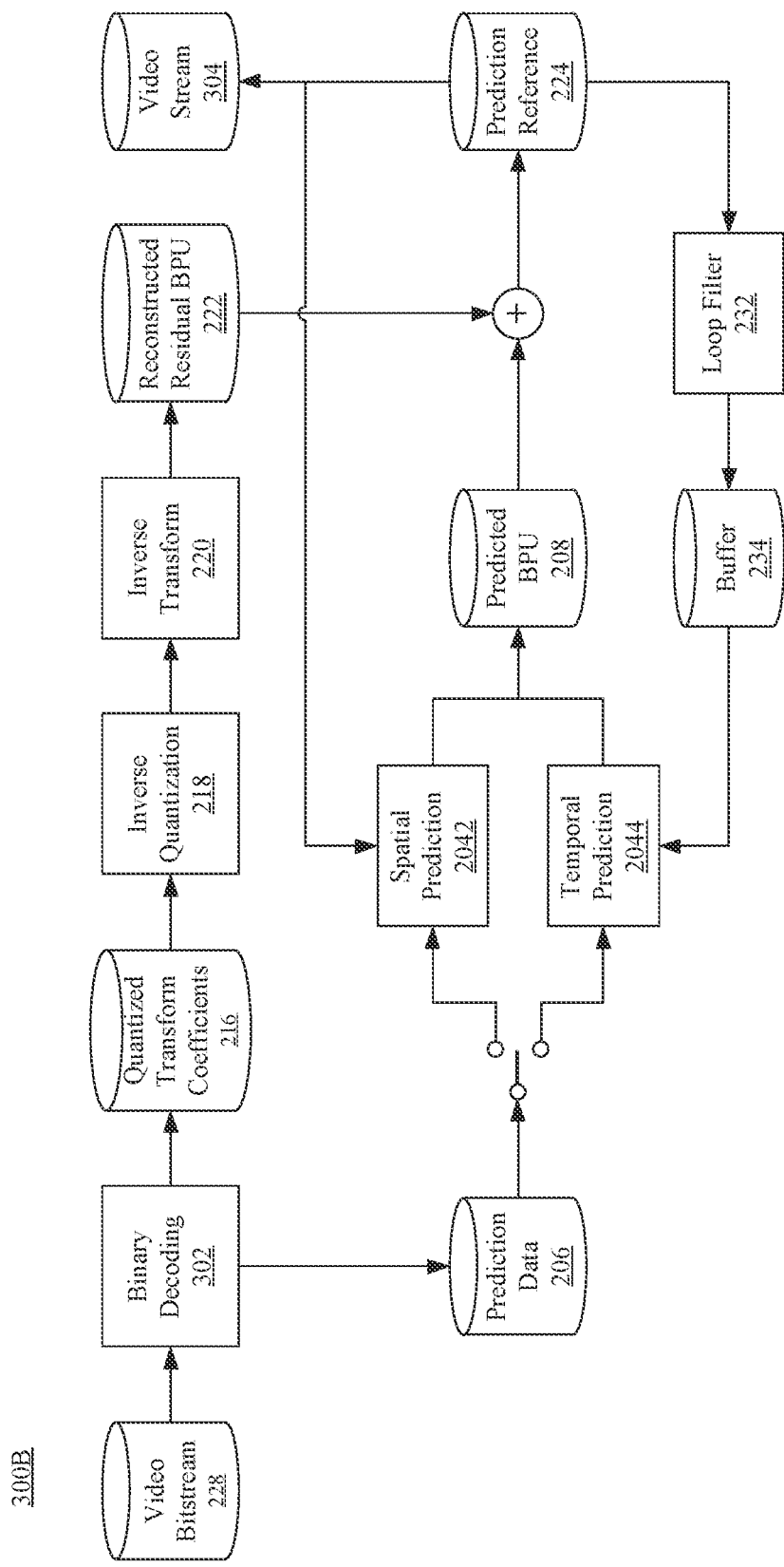
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
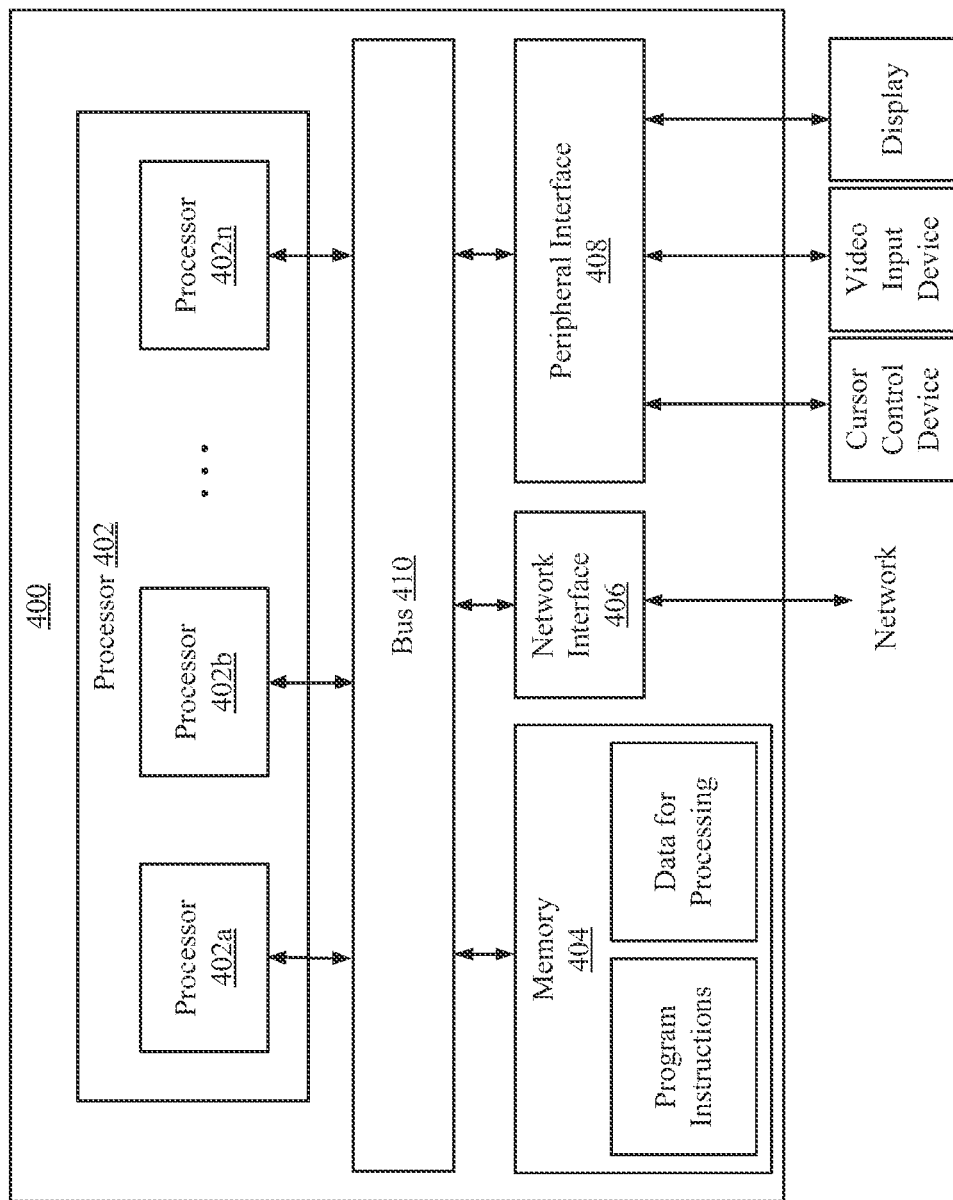
FIG. 4 is a block diagram of an exemplary apparatus for encoding or decoding a video, consistent with embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
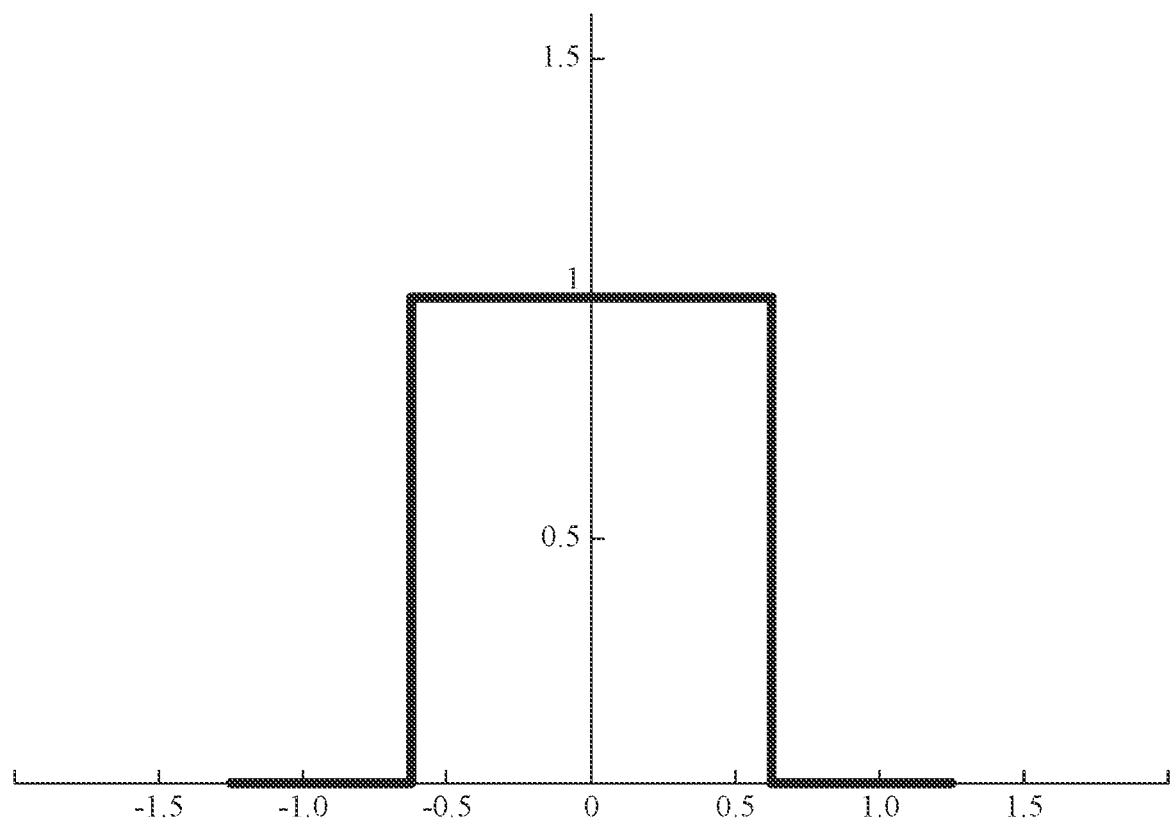
FIG. 5 illustrates a schematic diagram of an exemplary frequency response of a low-pass filter, consistent with embodiments of the disclosure.

Interpolation tasks arise naturally in the context of video coding because the true displacements of objects from one picture to another are independent of the sampling grid of cameras. Therefore, in motion compensation (MC) prediction, fractional-sample accuracy is used to more accurately capture continuous motion. Samples available at integer positions are filtered to estimate values at fractional positions. HEVC supports motion vectors with quarter-pixel accuracy for the luma component and one-eighth pixel accuracy for chroma components. If the motion vector has a half or quarter-pixel accuracy, samples at fractional positions can be interpolated using the samples at integer-sample positions. This spatial domain operation can be seen in the frequency domain as introducing phase delays to individual frequency components. An ideal interpolation filter for band-limited signals induces a constant phase delay to all frequencies and does not alter their magnitudes, which allows all frequencies below a cutoff frequency pass through with amplitude 1 and stops all frequencies above the cutoff frequency with zero amplitude, as shown in FIG. 5.

An important parameter for interpolation filters is the number of filter taps as it has a direct influence on both coding efficiency and implementation complexity. In general, filters with more taps could achieve better interpolation performance. In terms of implementation, it not only has an impact on the arithmetic operations but also on the memory bandwidth required to access the reference samples. In some embodiments, the luma interpolation process uses a symmetric 8-tap filter for half-pel positions and an asymmetric 7-tap filter for quarter-pel positions to minimize the additional complexity of the motion compensation process. For chroma samples, a 4-tap filter can be introduced.

HEVC interpolation filter can forward transform the known integer samples to the discrete cosine transform (DCT) domain and inverse transform the DCT coefficients to the spatial domain using DCT basis sampled at desired fractional positions, instead of integer positions. These operations can be combined into a single finite impulse response (FIR) filters. The coefficients of the FIR filters are designed using a Fourier decomposition of the discrete cosine transform. The resulting interpolation filter is thus named DCT-based interpolation filter (DCTIF). A brief overview of the DCTIF is provided below.

Let l ($l=-(N/2)+1, \ldots, N/2$) denote the position of integer samples, a denote the desired fractional position (e.g. ¼, ½ ... ). When the filter tap is set to N, the coefficient $Filter_l(\alpha)$ is derived according to Equation (1) below.

$$Filter_l(\alpha) = S(m) \Sigma_{k=0}^{N-1} (W_k(\alpha) \cdot D_{l,k})$$   Eq. (1)

where $$W_k(\alpha) = \begin{cases} \dfrac{1}{2} & (k = 0) \\ \cos\left(\dfrac{2\cdot\alpha - 1 + N}{2\cdot N}\cdot k\cdot\pi\right) & (k = 1 \ldots N-1) \end{cases}$$

$$D_{l,k} = \dfrac{2}{N}\cdot\cos\left(\dfrac{2\cdot l - 1 + N}{2\cdot N}\cdot k\cdot\pi\right)$$

S(m) is the smoothing window function to make the filter kernel in finite length, which can be defined as Equation (2) below.

$$S(m) = \cos\left(\pi\cdot\dfrac{l - \alpha}{m}\right) \quad \text{Eq. (2)}$$

where m is the smoothing parameter.

Filter coefficients $Filter_l(\alpha)$ are real numbers with magnitude no higher than 1. To enable fixed-point implementations, all filter coefficients are multiplied by a scaling factor $2^s$ (where s is 6 in HEVC) and rounded to the nearest integer according to Equation (3) below.

$$filter_l(a) = round(Filter_l(\alpha)\cdot 2^s) \quad \text{Eq. (3)}$$

The resulting coefficients of the interpolation filter of HEVC are shown in Tables 6-7 of FIGS. 6-7 for luma and chroma components, respectively.

In some embodiments, the motion vector resolution can be extended to one-sixteenth accuracy. DCTIF can still be used for the motion compensation interpolation and the filter coefficients are shown in Tables 8-9 of FIGS. 8-9 for luma and chroma components, respectively.

For the luma components, if half-pel adaptive motion vector resolution (AMVR) mode is selected and interpolated position is half-pel, a 6-tap filter (e.g., [3, 9, 20, 20, 9, 3]) can be used. Otherwise, if the motion compensated block size is 4×4, the following 6-tap filters as shown in Table 10 of FIG. 10 can be used.

The 6-tap filter in Table 10 of FIG. 10 is used for the 4×4 motion compensation block. However, this filter is not derived based on the DCTIF. From the coefficients, it can be seen that the coefficients p[−2], p[3] of 6-tap filter are obtained by adding the coefficients p[−3] and p[4] of 8-tap filters into p[−2] and p[3], respectively. The filter derived by this way may not approximate the ideal impulse response filter, and also not align with the 8-tap DCTIF for the other motion compensation blocks.

A filter according to embodiments of the disclosure will be described as below.

In some embodiments, a number of filter taps can be set to 6. Let l (l=−2, . . . , 3) denote the position of integer samples, a denote the desired fractional position (e.g. ¼, ½ . . . ). The coefficient $Filter_l(\alpha)$ is derived by Equation (4) below.

$$Filter_l(\alpha) = S(m)\Sigma_{k=0}^{5}(W_k(\alpha)\cdot D_{l,k}) \quad \text{Eq. (4)}$$

and the DCT-based interpolation filter can be expressed $$Filter_l(\alpha) = S(m)\Sigma_{k=0}^{5}(W_k(\alpha)\cdot D_{l,k}) \quad \text{Eq. (5)}$$

where $$W_k(\alpha) = \begin{cases} \dfrac{1}{2} & (k = 0) \\ \cos\left(\dfrac{2\cdot\alpha + 5}{15}\cdot k\cdot\pi\right) & (k = 1 \ldots N-1) \end{cases}$$

S(m) is the smoothing window function to make the filter kernel in finite length, which can be defined as Equation (6) below.

$$S(m) = \cos\left(\pi\cdot\dfrac{l - \alpha}{m}\right) \quad \text{Eq. (6)}$$

where m is the smoothing parameter. Here, the smoothing parameter is set to Table 11 of FIG. 11.

Then, the real-number filter coefficients are calculated as shown in Table 12 of FIG. 12.

When rounding the real-number filters to the integer coefficients, a scaling factor of 64 can be used here. And the resulting 6-tap DCTIF is shown in Table 13 of FIG. 13.

Compared to the 6-tap filter in Table 10 of FIG. 10, the proposed 6-tap DCT-based filter in Table 13 of FIG. 13 can be smoother in some phases. That is, the coefficient variants among different positions decrease to a little extent.

To enable fixed-point implementations, the filter coefficients are multiplied by a scaling factor $2^s$ and rounded to the nearest integer. Therefore, the scaling and rounding process also impact on the resulting filter. In some embodiments, another rounding method according to embodiments of the disclosure can be provided as below, and the rounding method can include steps as below.

At step 1, for the N-tap real-number coefficients $F_l(\alpha)$ (l=−(N/2)+1, . . . , N/2) of fractional position α, let $f_l(\alpha)$ denote the integer-number coefficient after rounding. The coefficients satisfying the following Equation (7) are first rounded to the nearest integer number.

$$f_l(\alpha) = \begin{cases} \lfloor F_l(\alpha)\rfloor & \text{if } F_l(\alpha) - \lfloor F_l(\alpha)\rfloor < \beta \\ \lceil F_l(\alpha)\rceil & \text{if } \lceil F_l(\alpha)\rceil - F_l(\alpha) < \beta \end{cases} \quad \text{Eq. (7)}$$

where β (0<β<1) is a threshold and set to 0.3 here.

At step 2, without loss of generality, let $F_i(\alpha)$ denote the filter coefficients rounded in step 1 and $F_j(a)$ denote other filter coefficients. Thus, Equation (8) can be derived as below.

$$\Sigma f_j(\alpha) = 2^s - \Sigma f_i(\alpha) \quad \text{Eq. (8)}$$

where s denote the scaling factor and set to 6 here. Based on this constraint, the rounding of $F_j(\alpha)$ is determined by minimizing the rounding displacement as Equation (9) below:

$$\min\{\Sigma|f_j(\alpha) - F_j(\alpha)|\}, f_j(\alpha) \in \{\lfloor F_j(\alpha)\rfloor, \lceil F_j(\alpha)\rceil\} \quad \text{Eq. (9)}$$

Taking α=¼ as the example, the $F_l(¼)$ can be:

| Stage | Interpolation filter coefficients for 1/4 fractional position ||||||||
| | l = −3 | l = −2 | l = −1 | l = 0 | l = 1 | l = 2 | l = 3 | l = 4 |
| --- | --- | --- | --- | --- | --- | --- | --- | --- |
| $F_l(1/4)$ | 0 | 1.521 | −8.209 | 56.53 | 17.94 | −4.989 | 0.88 | 0 |

During step 1, it is found that the rounding condition is satisfied for l={−1, 1, 2, 3}, and hence

| Stage | Interpolation filter coefficients for 1/4 fractional position ||||||||
| | l = −3 | l = −2 | l = −1 | l = 0 | l = 1 | l = 2 | l = 3 | l = 4 |
| --- | --- | --- | --- | --- | --- | --- | --- | --- |
| $F_l(1/4)$ | 0 | 1.521 | −8.209 | 56.53 | 17.94 | −4.989 | 0.88 | 0 |
| Step 1 | 0 | 1.521 | −8 | 56.53 | 18 | −5 | 1 | 0 |

During step 2, it is first inferred that $$f_{-2}(¼)+f_0(¼)=2^6-(-8+18-5+1)=58 \quad \text{Eq. (10)}$$

Then, $f_{-2}(¼)$ could be {1, 2} and $f_0(¼)$ could be {56, 57}. After checking all the combinations, it is found that $f_{-2}(¼)=1$, $f_0(¼)=57$ could minimize the rounding error. Finally, the integer-number filter coefficients for ¼ fractional position are:

| Stage | Interpolation filter coefficients for 1/4 fractional position ||||||||
| | l = −3 | l = −2 | l = −1 | l = 0 | l = 1 | l = 2 | l = 3 | l = 4 |
| --- | --- | --- | --- | --- | --- | --- | --- | --- |
| $F_l(1/4)$ | 0 | 1.521 | −8.209 | 56.53 | 17.94 | −4.989 | 0.88 | 0 |
| Step 1 | 0 | 1.521 | −8 | 56.53 | 18 | −5 | 1 | 0 |
| $f_l(1/4)$ | 0 | 1 | −8 | 57 | 18 | −5 | 1 | 0 |

In this manner, the proposed integer 6-tap DCT-based interposition filter is shown Table 14 of FIG. 14.

It is appreciated that other rounding methods may be used. For example, the threshold β in step 1 could be set to 0.4. Otherwise, the number of coefficients rounded in step 1 could also be set as a parameter related to the number of filter tap, for example, N−2.

An interpolation filter with the smoothing window function aims to approximate the frequency response of ideal interpolation as closely as possible. In the DCTIF of HEVC and VVC, the smoothing window function uses the cosine function cos(π·(l−α)/m). However, a proper smoothing function may be different for various circumstances. In some embodiments, the smoothing window of sine function can be used. For example, the sine window function can be expressed as below Equation (11).

$$S(m) = \sin\left(\pi \cdot \frac{m+l-\alpha}{2m}\right) \quad \text{Eq. (11)}$$

where m is the smoothing parameter, l represents the position of integer samples and a represents the desired fractional position.

The value of smoothing parameter m may not be fixed. If given the values of m as Table 15 of FIG. 15, the proposed filter coefficients are shown in Tables 16-17 of FIGS. 16-17.

If the smooth window function can be removed, the DCTIF can be rewritten as below Equation (12).

$$\text{Filter}_l(\alpha)=\Sigma_{k=0}^{N-1}(W_k(\alpha)\cdot D_{l,k}) \quad \text{Eq. (12)}$$

where the definitions of $W_k(\alpha)$ and $D_{l,k}$ are as same as above. In this case, the filter coefficients are shown in Tables 18-19 of FIGS. 18-19.

Figure 20:
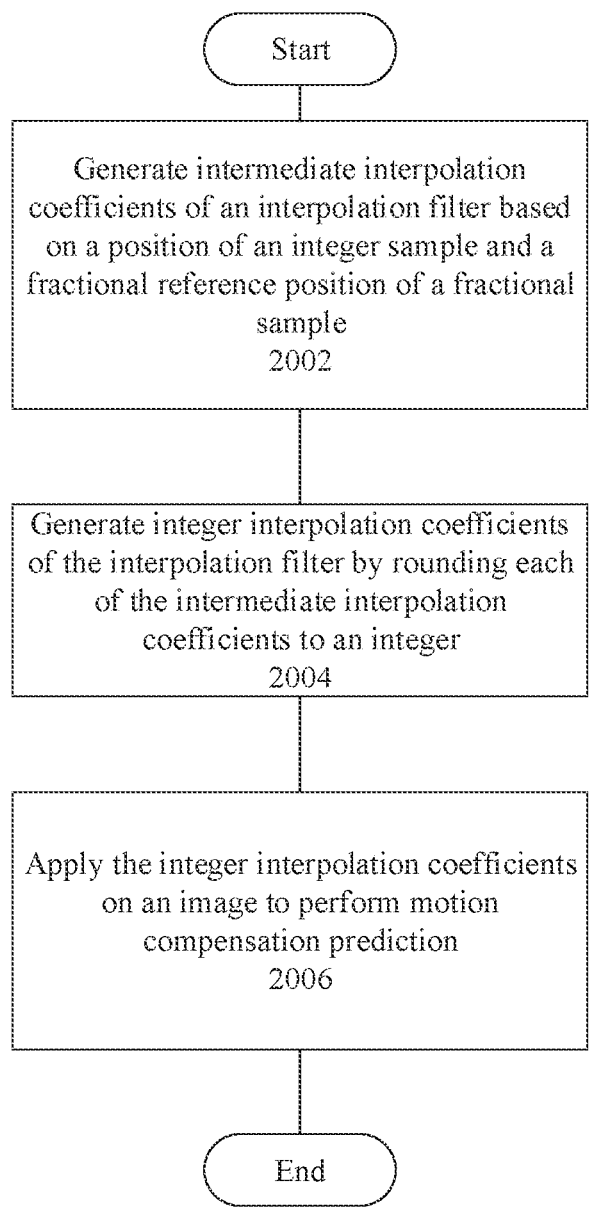
FIG. 20 is a flowchart of a computer-implemented method for processing a video content, consistent with embodiments of the disclosure.

FIG. 20 is a flowchart of a computer-implemented method 2000 for processing a video content, consistent with embodiments of the disclosure. In some embodiments, method 2000 can be performed by a codec (e.g., an encoder using encoding processes 200A or 200B in FIGS. 2A-2B or a decoder using decoding processes 300A or 300B in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures. The apparatus can perform method 2000 at the level of pictures. For example, the apparatus can process one picture at a time in method 2000. For another example, the apparatus can process a plurality of pictures at a time in method 2000. Method 2000 can include steps as below.

At step 2002, intermediate interpolation coefficients of an interpolation filter can be generated based on a position of an integer sample and a fractional reference position of a fractional sample. In some embodiments, it can be determined whether an intermediate interpolation coefficient satisfies a condition in association with a difference between the intermediate interpolation coefficient and the integer that is nearest to the intermediate interpolation coefficient. The condition can be referred to Equation (7) above. The difference between the intermediate interpolation coefficient and the integer that is nearest to the intermediate interpolation coefficient is less than a given threshold. The given threshold can be set to 0.3.

In some embodiments, when the intermediate interpolation coefficients do not satisfy the above condition, at least one intermediate interpolation coefficient not satisfying the condition can be determined. Then, at least one combination of at least one rounded intermediate interpolation coefficient can be generated by rounding each of the at least one intermediate interpolation coefficient not satisfying the condition to a next integer. A first combination can be selected from the at least one combination. The first combination can include at least one rounded intermediate interpolation coefficient that has a minimal sum of rounding errors.

At step 2004, integer interpolation coefficients of the interpolation filter can be generated by rounding each of the intermediate interpolation coefficients to an integer that is nearest to the intermediate interpolation coefficient. That is, when the condition at step 2004 is satisfied, the intermediate interpolation coefficient can be rounded to the integer that is nearest to the intermediate interpolation coefficient.

At step 2006, the integer interpolation coefficients can be applied on an image to perform motion compensation prediction. In some embodiments, the integer interpolation coefficients can be further smoothed based on a smoothing window function.

The smoothing window function can be at least one of: a cosine function in association with the position of the integer sample, the fractional reference position of the fractional sample, and a smoothing parameter; or a sine function in association with the position of the integer sample, the fractional reference position of the fractional sample, and a smoothing parameter. For example, the smoothing window function can be expressed as above Equation (2).

In some embodiments, an output of the smoothing window function is a constant value. For example, the constant value is equal to 1.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A computer-implemented method for processing video content, comprising:
   determining a plurality of intermediate interpolation coefficients of an interpolation filter, wherein the plurality of intermediate interpolation coefficients are determined:
   based on positions of a plurality of integer samples respectively, and
   based on fractional reference positions of a plurality of fractional samples respectively;
   determining a plurality of integer interpolation coefficients of the interpolation filter by rounding the plurality of intermediate interpolation coefficients to a plurality of integers respectively; and
   applying the plurality of integer interpolation coefficients on a picture to perform motion compensation prediction.

2. The method according to clause 1, wherein determining the plurality of integer interpolation coefficients of the interpolation filter by rounding the plurality of intermediate interpolation coefficients to the plurality of integers respectively further comprises:
   minimizing a sum of rounding errors of the plurality of intermediate interpolation coefficients.

3. The method according to clause 2, further comprising:
   determining whether each of the plurality of intermediate interpolation coefficients satisfies a condition; and
   in response to a first intermediate interpolation coefficient satisfying the condition, rounding the first intermediate interpolation coefficient to an integer that is nearest to the first intermediate interpolation coefficient.

4. The method according to clause 3, wherein the condition comprises:
   a difference between an intermediate interpolation coefficient and an integer that is nearest to the intermediate interpolation coefficient is less than a given threshold.

5. The method according to clause 3, further comprising:
   in response to a determination that one or more of the plurality of intermediate interpolation coefficients do not satisfy the condition, rounding the one or more intermediate interpolation coefficients to one or more integers respectively, wherein the sum of the rounding errors of the plurality of intermediate interpolation coefficients has a minimal value.

6. The method according to clause 1, wherein applying the plurality of integer interpolation coefficients on the picture further comprises:
   smoothing the plurality of integer interpolation coefficients based on a smoothing window function.

7. The method according to clause 6, wherein the smoothing window function is at least one of:
   a cosine function in association with the positions of the plurality of integer samples, the fractional reference positions of the plurality of fractional samples, and a smoothing parameter; or
   a sine function in association with the positions of the plurality of integer samples, the fractional reference positions of the plurality of fractional samples, and a smoothing parameter.

8. The method according to clause 6, wherein an output of the smoothing window function is a constant value.

9. The method according to clause 8, wherein the constant value is equal to 1.

10. A system for processing video content, comprising:
    a memory for storing a set of instructions; and
    at least one processor configured to execute the set of instructions to cause the system to perform:
    determining a plurality of intermediate interpolation coefficients of an interpolation filter, wherein the plurality of intermediate interpolation coefficients are determined:
    based on positions of a plurality of integer samples respectively, and
    based on fractional reference positions of a plurality of fractional samples respectively;
    determining a plurality of integer interpolation coefficients of the interpolation filter by rounding the plurality of intermediate interpolation coefficients to a plurality of integers respectively; and
    applying the plurality of integer interpolation coefficients on a picture to perform motion compensation prediction.

11. The system according to clause 10, wherein in determining the plurality of integer interpolation coefficients of the interpolation filter by rounding the plurality of intermediate interpolation coefficients to the plurality of integers respectively, the at least one processor is configured to execute the set of instructions to cause the system to further perform:

minimizing a sum of rounding errors of the plurality of intermediate interpolation coefficients.

12. The system according to clause 11, wherein the at least one processor is configured to execute the set of instructions to cause the system to further perform:

determining whether each of the plurality of intermediate interpolation coefficients satisfies a condition; and in response to a first intermediate interpolation coefficient satisfying the condition, rounding the first intermediate interpolation coefficient to an integer that is nearest to the first intermediate interpolation coefficient.

13. The system according to clause 12, wherein the condition comprises:

a difference between an intermediate interpolation coefficient and an integer that is nearest to the intermediate interpolation coefficient is less than a given threshold.

14. The system according to clause 12, wherein the at least one processor is configured to execute the set of instructions to cause the system to further perform:

in response to a determination that one or more of the plurality of intermediate interpolation coefficients do not satisfy the condition, rounding the one or more intermediate interpolation coefficients to one or more integers respectively, wherein the sum of the rounding errors of the plurality of intermediate interpolation coefficients has a minimal value.

15. The system according to clause 10, wherein in applying the plurality of integer interpolation coefficients on the picture further, the at least one processor is configured to execute the set of instructions to cause the system to further perform:

smoothing the plurality of integer interpolation coefficients based on a smoothing window function.

16. The system according to clause 15, wherein the smoothing window function is at least one of:

a cosine function in association with the positions of the plurality of integer samples, the fractional reference positions of the plurality of fractional samples, and a smoothing parameter; or a sine function in association with the positions of the plurality of integer samples, the fractional reference positions of the plurality of fractional samples, and a smoothing parameter.

17. The system according to clause 15, wherein an output of the smoothing window function is a constant value.

18. The system according to clause 17, wherein the constant value is equal to 1.

19. A non-transitory computer readable medium storing instructions that are executable by at least one processor of a computer system, wherein the execution of the instructions causes the computer system to perform a method comprising:

determining a plurality of intermediate interpolation coefficients of an interpolation filter, wherein the plurality of intermediate interpolation coefficients are determined:
based on positions of a plurality of integer samples respectively, and
based on fractional reference positions of a plurality of fractional samples respectively;

determining a plurality of integer interpolation coefficients of the interpolation filter by rounding the plurality of intermediate interpolation coefficients to a plurality of integers respectively; and applying the plurality of integer interpolation coefficients on a picture to perform motion compensation prediction.

20. The non-transitory computer readable medium according to clause 19, wherein in determining the plurality of integer interpolation coefficients of the interpolation filter by rounding the plurality of intermediate interpolation coefficients to the plurality of integers respectively, the execution of the instructions causes the computer system to further perform:

minimizing a sum of rounding errors of the plurality of intermediate interpolation coefficients.

21. The non-transitory computer readable medium according to clause 20, wherein the execution of the instructions causes the computer system to further perform:

determining whether each of the plurality of intermediate interpolation coefficients satisfies a condition; and in response to a first intermediate interpolation coefficient satisfying the condition, rounding the first intermediate interpolation coefficient to an integer that is nearest to the first intermediate interpolation coefficient.

22. The non-transitory computer readable medium according to clause 21, wherein the condition comprises;

a difference between an intermediate interpolation coefficient and an integer that is nearest to the intermediate interpolation coefficient is less than a given threshold.

23. The non-transitory computer readable medium according to clause 21, wherein the execution of the instructions causes the computer system to further perform:

in response to a determination that one or more of the plurality of intermediate interpolation coefficients do not satisfy the condition, rounding the one or more intermediate interpolation coefficients to one or more integers respectively, wherein the sum of the rounding errors of the plurality of intermediate interpolation coefficients has a minimal value.

24. The non-transitory computer readable medium according to clause 19, wherein in applying the plurality of integer interpolation coefficients on the picture further, the execution of the instructions causes the computer system to further perform:

smoothing the plurality of integer interpolation coefficients based on a smoothing window function.

25. The non-transitory computer readable medium according to clause 24, wherein the smoothing window function is at least one of:

a cosine function in association with the positions of the plurality of integer samples, the fractional reference positions of the plurality of fractional samples, and a smoothing parameter; or a sine function in association with the positions of the plurality of integer samples, the fractional reference positions of the plurality of fractional samples, and a smoothing parameter.

26. The non-transitory computer readable medium according to clause 24, wherein an output of the smoothing window function is a constant value.

27. The non-transitory computer readable medium according to clause 26, wherein the constant value is equal to 1.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for processing video content, comprising:
    encoding or decoding a picture block by applying a first interpolation filter to a reference picture to perform motion compensated interpolation based on the reference picture,
    wherein the first interpolation filter has a plurality of integer interpolation coefficients derived based on a discrete cosine transform (DCT) interpolation filter, the plurality of integer interpolation coefficients comprising a first set of coefficients {0, 1, −5, 62, 8, −3, 1, 0} associated with integer reference sample positions {−3, −2, −1, 0, 1, 2, 3, 4}, respectively.

2. The method according to claim 1, wherein the first set of coefficients is used for estimating luma values at a 1/8 fractional sample position.

3. The method according to claim 1, wherein the plurality of integer interpolation coefficients comprises a second set of coefficients {0, 2, −8, 60, 13, −4, 1, 0} associated with integer reference sample positions {−3, −2, −1, 0, 1, 2, 3, 4}, respectively.

4. The method according to claim 3, wherein the second set of coefficients is used for estimating luma values at a 3/16 fractional sample position.

5. The method according to claim 1, wherein the plurality of integer interpolation coefficients comprises a second set of coefficients {0, 3, −11, 45, 34, −10, 3, 0} associated with integer reference sample positions {−3, −2, −1, 0, 1, 2, 3, 4}, respectively.

6. The method according to claim 5, wherein the second set of coefficients is used for estimating luma values at a 7/16 fractional sample position.

7. The method according to claim 1, wherein the plurality of integer interpolation coefficients comprises a second set of coefficients {0, 3, −11, 40, 40, −11, 3, 0} associated with integer reference sample positions {−3, −2, −1, 0, 1, 2, 3, 4}, respectively.

8. The method according to claim 7, wherein the second set of coefficients is used for estimating luma values at a 1/2 fractional sample position.

9. The method according to claim 1, wherein the plurality of integer interpolation coefficients comprises 15 sets of coefficients, each set of the coefficients being used for estimating luma values at a 1/16 fractional sample position.

10. The method according to claim 1, wherein the first interpolation filter is a 6-tap filter.

11. The method according to claim 1, wherein the DCT interpolation filter is used in a High Efficiency Video Coding (HEVC) standard.

12. The method according to claim 1, wherein the first interpolation filter is an N-tap filter, and the plurality of integer interpolation coefficients are derived based on:

$$\Sigma_{k=0}^{5}(W_k(\alpha) \cdot D_{l,k}),$$

wherein l denotes integer reference sample positions and l=−(N/2)+1, . . . , N/2),
wherein a denotes fractional sample positions associated with the first interpolation filter,
wherein:

$$W_k(\alpha) = \begin{cases} \dfrac{1}{2} & (k=0) \\ \cos\left(\dfrac{2\cdot\alpha+5}{12}\cdot k \cdot \pi\right) & (k=1 \ldots N-1) \end{cases}, \text{ and}$$

wherein $$D_{l,k} = \dfrac{1}{3} \cdot \cos\left(\dfrac{2 \cdot l + 5}{12} \cdot k \cdot \pi\right).$$

13. A system for processing video content, comprising:
a memory for storing a set of instructions; and
at least one processor configured to execute the set of instructions to cause the system to perform:
    encoding or decoding a picture block by applying a first interpolation filter to a reference picture to perform motion compensated interpolation based on the reference picture,
    wherein the first interpolation filter has a plurality of integer interpolation coefficients derived based on a discrete cosine transform (DCT) interpolation filter, the plurality of integer interpolation coefficients comprising a first set of coefficients {0, 1, −5, 62, 8, −3, 1, 0} associated with integer reference sample positions {−3, −2, −1, 0, 1, 2, 3, 4}, respectively.

14. The system according to claim 13, wherein the plurality of integer interpolation coefficients comprises a second set of coefficients {0, 2, −8, 60, 13, −4, 1, 0} associated with integer reference sample positions {−3, −2, −1, 0, 1, 2, 3, 4}, respectively.

15. The system according to claim 13, wherein the plurality of integer interpolation coefficients comprises a second set of coefficients {0, 3, −11, 45, 34, −10, 3, 0} associated with integer reference sample positions {−3, −2, −1, 0, 1, 2, 3, 4}, respectively.

16. The system according to claim 13, wherein the plurality of integer interpolation coefficients comprises a second set of coefficients {0, 3, −11, 40, 40, −11, 3, 0} associated with integer reference sample positions {−3, −2, −1, 0, 1, 2, 3, 4}, respectively.

17. A non-transitory computer readable medium storing a bitstream of a video for processing according to a method comprising:
encoding or decoding a picture block by applying a first interpolation filter to a reference picture to perform motion compensated interpolation based on the reference picture,
wherein the first interpolation filter has a plurality of integer interpolation coefficients derived based on a discrete cosine transform (DCT) interpolation filter, the plurality of integer interpolation coefficients comprising a first set of coefficients {0, 1, −5, 62, 8, −3, 1, 0} associated with integer reference sample positions {−3, −2, −1, 0, 1, 2, 3, 4}, respectively.

18. The non-transitory computer readable medium according to claim 17, wherein the plurality of integer interpolation coefficients comprises a second set of coefficients {0, 2, −8, 60, 13, −4, 1, 0} associated with integer reference sample positions {−3, −2, −1, 0, 1, 2, 3, 4}, respectively.

19. The non-transitory computer readable medium according to claim 17, wherein the plurality of integer interpolation coefficients comprises a second set of coefficients {0, 3, −11, 45, 34, −10, 3, 0} associated with integer reference sample positions {−3, −2, −1, 0, 1, 2, 3, 4}, respectively.

20. The non-transitory computer readable medium according to claim 17, wherein the plurality of integer interpolation coefficients comprises a second set of coefficients {0, 3, −11, 40, 40, −11, 3, 0} associated with integer reference sample positions {−3, −2, −1, 0, 1, 2, 3, 4}, respectively.

* * * * *